United States Patent [19]
Bradley

[11] 3,972,532
[45] Aug. 3, 1976

[54] PUTTING PRACTICE DEVICE

[76] Inventor: David N. Bradley, 10430 105th Drive, Sun City, Ariz. 85351

[22] Filed: Dec. 3, 1975

[21] Appl. No.: 637,386

[52] U.S. Cl. .......................... 273/183 C; 273/213; 273/235 R
[51] Int. Cl.² ........................................ A63B 69/36
[58] Field of Search ........... 273/183, 186, 199, 200; 35/29 A

[56] References Cited
UNITED STATES PATENTS

| | | | |
|---|---|---|---|
| 3,165,930 | 1/1965 | Halpern et al. | 273/183 C X |
| 3,826,503 | 7/1974 | Rawson | 273/183 C |

Primary Examiner—George J. Marlo
Attorney, Agent, or Firm—William S. Pettigrew

[57] ABSTRACT

This invention comprises a Putting Practice Device including a support having a simulated golf ball mounted for limited movement thereon between operative and operated positions. Right and left putter contactors are mounted on said support on opposite sides of the ball, the contactors being equally spaced from the ball and being spaced apart a distance less than the length of the putting face of a conventional golf putter. Right and left visual signaling lights are mounted on the support to be viewed from above. Electrical elements on the support includes a circuit connected so that a putter stroking the ball from operative position toward operated position and also striking a contactor will cause the associated signaling light to be activated.

6 Claims, 7 Drawing Figures

PUTTING PRACTICE DEVICE

BACKGROUND OF THE INVENTION

This invention relates to a putting practice device, and more particularly to a device enabling a golfer to improve his putting accuracy.

During the putting stroke, many golfers inadvertently turn the club head to the right or left, thereby stroking the ball to the right or left of the intended target. This invention enables the golfer to repeatedly stroke a simulated ball with his putter and with each stroke to observe a visual signal indicating whether or not a golf ball would have been correctly aimed at the target. The golfer is enabled to change his grip on the putter, change his stance, or make other corrections to improve his aim and thereby improve his accuracy.

While other practice devices have been developed in the past, they have been bulky and not easily transportable from place to place. Furthermore, they have required the use of a "loose" ball which must be replaced after every stroke. The device of this invention utilizes a simulated ball which is mounted for limited movement on a support, being movable between operative and operated positions and being spring biased toward operative position. The golfer may stand in one position and rapidly and repeatedly make as many strokes as he wishes. With each stroke he sees a visual signal indicating his accuracy, thereby being able to correct his faulty aim much more easily than he could do if he were required to replace the ball after every stroke.

DESCRIPTION

Other features and advantages of the invention will be apparent from the following description and from the drawings, in which.

Figure 1:
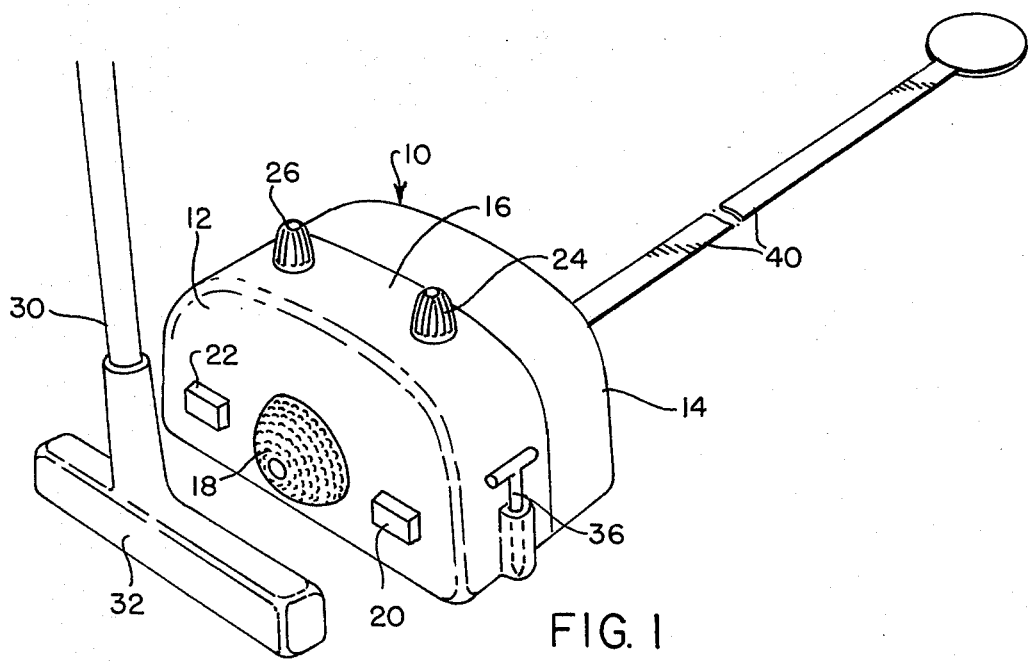
FIG. 1 is an isometric view, partly broken away, showing the device in operating position.
Figure 3:
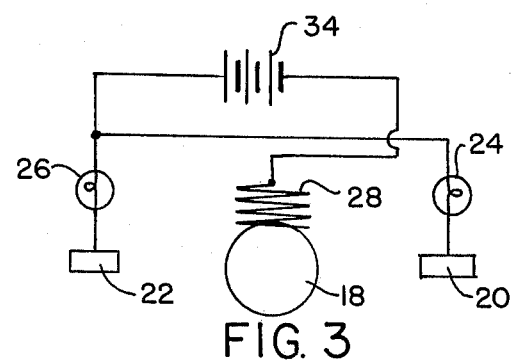
FIG. 3 is a schematic representation of the energizing means of FIG. 2.
Figure 2:
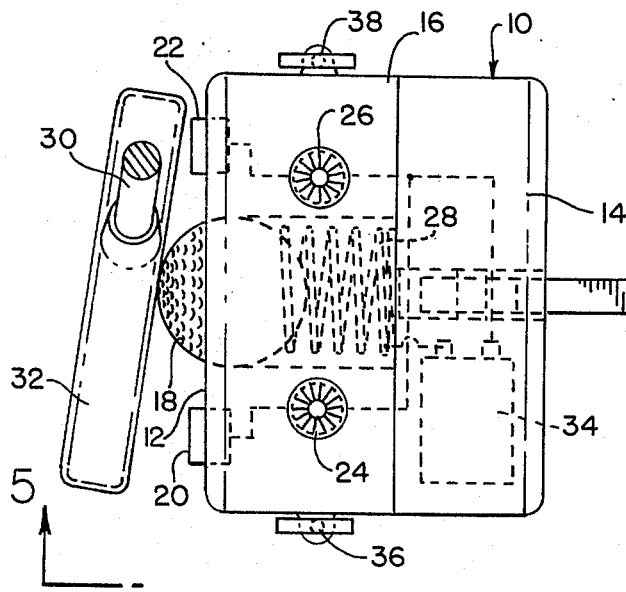
FIG. 2 is a top plan view of one species of the invention showing one condition of operation, certain interior parts being shown in broken lines.
Figure 4:
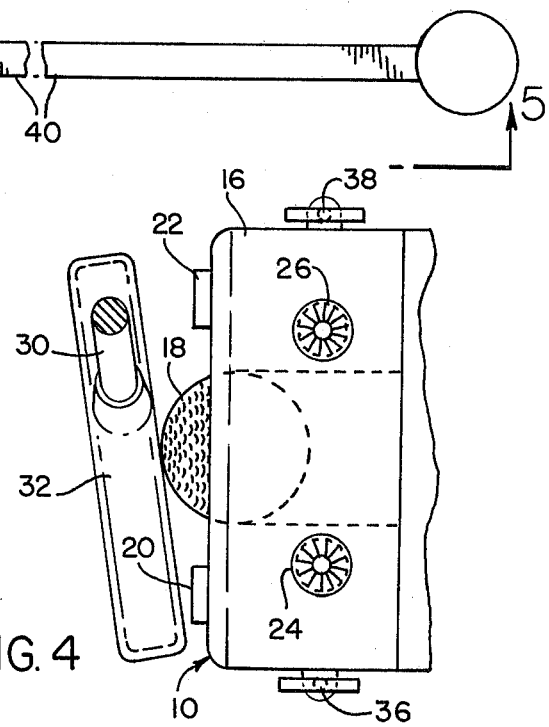
FIG. 4 is a partial plan view similar to FIG. 2, but showing a different condition of operation.

Referring to FIGS. 1–4, the device includes a support comprising a box shaped housing 10 having front and rear face 12, 14 and a top 16. In the housing are mounted a simulated golf ball 18, right and left putter contactors 20, 22 on opposite sides of the ball, right and left signaling lamps 24, 26 to provide a visual indication to the golfer, and energizing means to activate the signaling lamps.

The simulated ball 18 may be spherical as shown, or it may be a segment of a sphere. It may be a conventional golf ball. In any event, it has the diameter of a conventional golf ball and is mounted in the housing so that a segment of the sphere projects outwardly of the housing face 12. The ball 18 is biased outwardly of the housing face 12 by a light spring 28 so that when stroked with a golf putter 30 the ball 18 will move inwardly of the housing against the force of the spring 28 from the operative position shown to an operated position wherein the spring 28 is compressed. The ball 18 cannot escape from the housing, being restrained and held in operative position by the size of the opening through which the ball projects in the housing face 12. If desired, the ball may be secured to the spring 28, which in turn is secured to the housing. In any event, the ball 18 is permanently mounted in the housing for limited movement between the operative position shown and an operated position wherein the spring 28 is compressed.

If desired, adjustment means can be provided to locate the ball face a greater or lesser distance from the face 12 of the housing 10.

At least the outer surface of the ball 18 (in the species illustrated in FIGS. 1–4) is electrically conductive. The ball 18 may be made of metal, or it may be a conventional golf ball coated with electrically conductive material.

Figure 6:
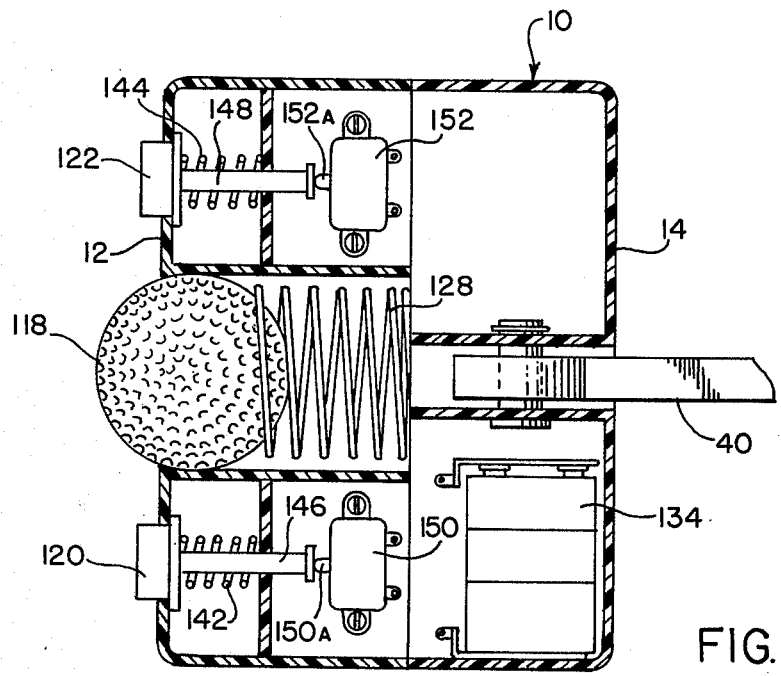
FIG. 6 is a horizontal section taken along the line 6—6 of FIG. 5, the electrical connection not being shown.

Right and left putter contactors 20, 22 project from the front face 12 of the housing on opposite sides of the ball 18, being equally spaced from the ball a distance preferably of about one-half inch and being located a distance above the base of the casing about equal to one-half the diameter of the ball. The contactors 20, 22 are spaced apart a distance less than the length of the metallic putting face 32 of a conventional golf putter 30. The contactors 20, 22 are made of metal or other electrically conductive material. This may be fixedly mounted in the housing 10 or they may be mounted for adjustment inwardly and outwardly of the housing face. If desired they may be slidable as shown in FIG. 6. Their foremost portions lie on a straight line parallel to the front face 12 of the housing and inwardly of said front face 12 from the outermost surface of the ball 18.

Right and left Visual signaling means each associated with a respective contactor comprise signaling lamps 24, 26 mounted in the housing top 16 so they can be viewed from above. Preferably the two signaling lamps 24, 26 are of different colors. In order to energize the signaling lamps 24, 26 to provide a visual signal to the golfer, a conventional flashlight battery 34 is mounted in the housing 10. One terminal of the battery 34 is connected to the left signaling lamp 26 and to the left contactor 22 in series, and also to the right signaling lamp 24 and the right contactor 20 in series. Obviously, the connections to the signaling lamps can be reversed from that above described if desired. The other terminal of the battery 34 is connected to the electrically conductive surface of the ball 18 through the spring 28.

When the ball 18 is stroked with a conventional metal faced putter 30, the ball moves inwardly against the force of the spring 28. If the putter 30 is turned out of a plane parallel to the plane of the foremost portions of the two contactors 20, 22, it will also strike one of the contactors, completing an electrical circuit through the signaling lamp associated with that contactor and causing that signaling lamp to be illuminated. This will indicate to the golfer and his putter is turned off target. If the putter 30 is not turned, it will strike both contactors substantially simultaneously while also being in control with the ball, illuminating both lamps simultaneously and thus providing an indication to the golfer that his aim was true.

The housing 10 preferably is weighted with a material of high specific gravity, as lead, so that the device is heavy enough to be used indoors on a tiled or carpeted surface, or the like. Any type of simulated target may be used, as a coin thrown on the floor.

Retractable spikes 36, 28 are mounted one in each end of the housing, to adapt the device for outdoor use. When used on a surface of grass or earth, the spikes may be pushed into the surface to anchor the housing securely.

In order to provide a true indication to the golfer that he is aiming at the simulated target, it is necessary that the housing be so located that the aforesaid line between the foremost portions of the contactors 20, 22 extend at right angles to a line running from the simulated target to the ball. In order to insure correct placement, a retractable guide is mounted in or on the housing. This guide may be a conventional rolled steel tape 40 mounted in or on the housing so that it may be extended at right angles to the line between the foremost portions of the contactors 20, 22. In addition to providing a guide for the correct positioning of the device, the steel tape 40 provides a measuring device to determine the distance to the simulated target. It also acts as a stabilizer for the housing.

Figure 5:
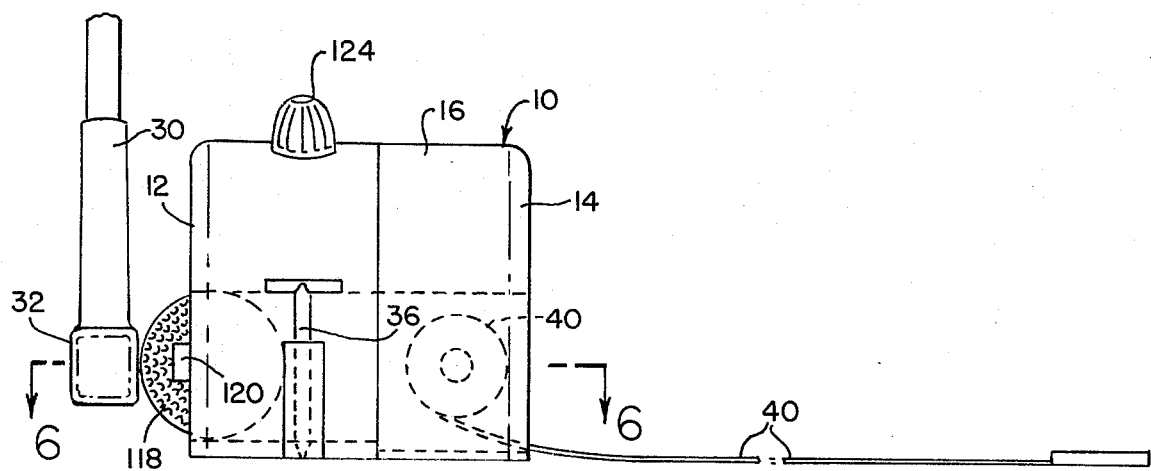
FIG. 5 is a side elevation of a modified form of the invention, certain interior parts being shown in broken lines.
Figure 7:
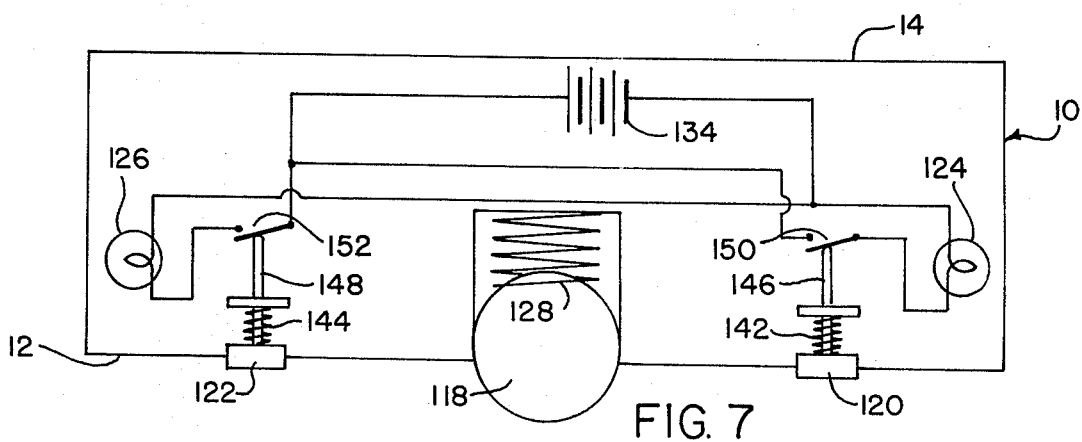
FIG. 7 is a schematic circuit diagram showing the energizing means for the modified form of the invention.

A modified form of the invention is shown in FIGS. 5, 6 and 7. In this form switches for energizing the signaling means are mounted inside the housing 10.

In this form of the invention, the ball 118 need not have an electrically conducting surface, but may comprise a conventional golf ball or a portion thereof. The ball 118 is biased outwardly by a light spring 128. The contactors 120, 122 are not electrical contacts. Instead, each is arranged to activate an electrical switch. The contactors are slidable inwardly and outwardly between operative and operated positions, and are biased outwardly by springs 142, 144 respectively. Respective rods 146, 148 project from the inner end of the respective contactors 120, 122. Rod 146 is in contact with the plunger 150a of a normally open switch 150. One terminal of the switch 150 is connected to one terminal of the battery 134 and the other terminal of the switch 150 is connected through a signaling lamp 124 to the other terminal of the battery 134.

Similarly, rod 148 is in contact with the plunger 152a of a normally open switch 152. One terminal of the switch 152 is connected to one terminal of the battery 134 and the other terminal of the switch 152 is connected through a signaling lamp 126 to the other terminal of the battery 134.

When the putter 30, being turned, strikes one or the other of the contactors 120, 122, that contactor moves inwardly to its operated position, closing its associated switch and illuminating the associated lamp. If the putter is aimed true, both lamps are illuminated substantially simultaneously.

While I have shown and described two embodiments of my invention, it is capable of many modifications. Changes, therefore, to the construction and arrangement may be made without departing from the spirit and scope of the invention as defined in the appended claims.

I claim:

1. A putting practice device comprising:
a support;
a simulated golf ball mounted for limited movement on said support between operative and operated positions;
spring means biasing said ball outwardly toward operative position;
right and left putter contactors mounted on said support on opposite sides of said ball, said contactors being equally spaced from the ball and being spaced apart a distance less than the length of the putting face of a conventional golf putter, the foremost portion of each contactor lying on a line parallel to the face of the support and inwardly of the support from the outermost surface of the ball;
right and left visual signaling means each associated with a respective contactor and mounted on the support to be viewed from above;
and electrical energizing means on said support and including a circuit connected so that a putter stroking said ball from operative position toward operated position and also striking a contactor will cause the associated signaling means to be activated.

2. A putting practice device comprising:
a support;
a simulated golf ball mounted for limited movement on said support between operative and operated positions;
spring means biasing said ball outwardly toward operative position;
right and left putter contactors mounted on said support on opposite sides of said ball, said contactors being equally spaced from the ball and being spaced apart a distance less than the length of the putting face of a conventional golf putter, the foremost portion of each contactor lying on a line parallel to the face of the support and inwardly of the support from the outermost surface of the ball;
right and left visual signaling means each associated with a respective contactor and mounted on the support to be viewed from above;
electrical energizing means on said support and including a circuit connected so that a putter stroking said ball from operative position toward operated position and also striking a contactor will cause the associated signaling means to be activated;
an extensible and retractable guide mounted on said support and adapted to be extended from the rear thereof at right angles to the line between the foremost portions of said contactors to provide for proper placement of said device with reference to a simulated target;
and at least one retractable anchoring spike mounted on said support to adapt the device for outdoor use.

3. A putting practice device comprising:
a support;
a simulated golf ball mounted for limited movement on said support between operative and operated positions, said ball having an electrically conductive surface;
spring means biasing said ball outwardly toward operative position;
right and left electrically conductive putter contactors mounted on said support on opposite sides of said ball, said contactors being equally spaced from the ball and being spaced apart a distance less than the length of the putting face of a conventional golf putter, the foremost portion of each controller lying on a line parallel to the face of the support and inwardly of the support from the outermost surface of the ball;

right and left visual signaling means each associated with a respective contactor and mounted on the support to be viewed from above;

electrical energizing means on said support;

electrical connections between said energizing means and the conductive surface of said ball;

and electrical connections between said energizing means and said right contactor and its associated signaling means in series and between said left contactor and its associated signaling means in series, whereby a putter stroking said ball from operative position toward operated position and also striking a contactor will cause the associated signaling means to be activated.

4. A putting practice device comprising:

a support comprising a box-like housing having a front face and a top;

a simulated golf ball mounted for limited movement on said support between operative and operated positions, said ball having an electrically conductive surface;

spring means biasing said ball outwardly toward operative position wherein a portion of said ball, including said conductive surface, projects from the front face of said housing;

right and left electrically conductive putter contactors mounted on said support on opposite sides of said ball, said contactors being equally spaced from the ball and being spaced apart a distance less than the length of the putting face of a conventional golf putter, the foremost portion of each contactor projecting from the front face of said housing and lying on a line parallel to said front face and inwardly of said front face from the outermost surface of the ball;

right and left visual signaling lamps each associated with a respective contactor and mounted on the support to be viewed from above;

electrical energizing means in said housing;

electrical connections between said energizing means and the conductive surface of said ball;

electrical connections between said energizing means and said right contactor and its associated signaling lamp in series and between said left contactor and its associated signaling lamp in series, whereby a putter stroking said ball from operative position toward operated position and also striking a contactor will cause the associated signaling lamp to be illuminated;

and an extensible and retractable guide mounted on said housing and adapted to be extended from the rear thereof at right angles to the line between the foremost portions of said contactors to provide for proper placement of said device with reference to a simulated target.

5. A putting practice device comprising:

a support;

a simulated golf ball mounted for limited movement on said support between operative and operated positions;

spring means biasing said ball outwardly toward operative position;

right and left putter contactors mounted on said support on opposite sides of said ball for movement between operative and operated positions, said contactors being equally spaced from the ball and being spaced apart a distance less than the length of the putting face of a conventional golf putter, the foremost portion of each contactor, when in operative position, lying on a line parallel to the face of the support and inwardly of the support from the outermost surface of the ball;

spring means biasing each contactor outwardly toward operative position;

right and left contactor switches mounted on said support, one in association with each contactor, each switch being open when its associated contactor is in operative position and being closed by its associated contactor upon movement thereof to operated position;

right and left visual signaling means each associated with a respective contactor and mounted on the support to be viewed from above;

electrical energizing means on said support;

and electrical connections between said energizing means and said right contactor switch and its associated signaling means in series and between said left contactor switch and its associated signaling means in series, whereby a putter stroking said balls from operative position toward operated position and also striking a contactor and moving it to operated position will cause the associated signaling means to be activated.

6. A putting practice device comprising:

a support comprising a box-like housing having a front face and a top;

a simulated golf ball mounted for limited movement on said support between operative and operated positions;

spring means biasing said ball outwardly toward operative position;

right and left putter contactors slidably mounted on said support on opposite sides of said ball for movement between operative and operated positions, said contactors being equally spaced from the ball and being spaced apart a distance less the length of the putting face of a conventional golf putter, the foremost portion of each contactor, when in operative position, lying on a line parallel to the face of the support and inwardly of the support from the outermost surface of the ball;

spring means biasing each contactor outwardly toward operative position;

right and left contactor switches mounted on said support, and in association with each contactor, each switch being open when its associated contactor is in operative position and being closed by its associated contactor upon movement thereof to operated position;

right and left visual signaling lamps each associated with a respective contactor and mounted on the support to be viewed from above;

electrical energizing means in said housing;

electrical connections between said energizing means and said right contactor switch and its associated signaling lamp in series and between said left contactor and its associated signaling lamp in series, whereby a putter stroking said ball from operative position toward operated position and also striking a contactor and moving it to operated position will cause the associated signaling lamp to be illuminated;

and an extensible and retractable guide mounted on said housing and adapted to be extended from the rear thereof at right angles to the line between the foremost portions of said contactors to provide for proper placement of said device with reference to a simulated target.

\* \* \* \* \*